(12) United States Patent
Xu

(10) Patent No.: US 9,285,658 B2
(45) Date of Patent: Mar. 15, 2016

(54) SYSTEMS AND DEVICES FOR SECURING AND SECURELY TRANSPORTING A CAMERA

(76) Inventor: Ye Xu, Bellaire, TX (US)

( * ) Notice: Subject to any disclaimer, the term of this patent is extended or adjusted under 35 U.S.C. 154(b) by 1100 days.

(21) Appl. No.: 13/349,200

(22) Filed: Jan. 12, 2012

(65) Prior Publication Data

US 2013/0101279 A1    Apr. 25, 2013

Related U.S. Application Data

(63) Continuation-in-part of application No. 13/317,576, filed on Oct. 21, 2011, now Pat. No. 8,579,523.

(51) Int. Cl.
*G03B 17/56* (2006.01)

(52) U.S. Cl.
CPC ............ *G03B 17/563* (2013.01); *G03B 17/566* (2013.01)

(58) Field of Classification Search
CPC .................................................. G03B 17/56
USPC ............................................................ 396/423
See application file for complete search history.

(56) References Cited

U.S. PATENT DOCUMENTS

| 817,207 | A | | 4/1906 | Wheeler |
|---|---|---|---|---|
| 2,130,262 | A | | 9/1938 | Burlin |
| 2,135,988 | A | | 11/1938 | Nagel |
| 2,190,268 | A | | 2/1940 | Magid |
| 2,480,662 | A | | 8/1949 | McKinzie |
| 2,586,954 | A | | 2/1952 | Juliano |
| 2,670,228 | A | † | 2/1954 | Pagliuso |
| 3,305,148 | A | | 2/1967 | Ximmerman |
| 3,559,853 | A | | 2/1971 | Strassman |
| 4,058,242 | A | | 11/1977 | Brewer |
| 4,136,726 | A | | 1/1979 | Lee |
| 4,328,917 | A | | 5/1982 | Reeberg |

(Continued)

FOREIGN PATENT DOCUMENTS

| JP | 2003-009930 | | 1/2003 |
|---|---|---|---|
| JP | 2004320695 | A | 11/2004 |

(Continued)

OTHER PUBLICATIONS

Web advertisement, Get HOOKed! from www.leicagoodies.com/lehook.html, Jan. 9, 2013.

(Continued)

*Primary Examiner* — Clayton E Laballe
*Assistant Examiner* — Fang-Chi Chang
(74) *Attorney, Agent, or Firm* — Benjamin A. Adler

(57) ABSTRACT

Provided herein are devices and systems for engaging and transporting a camera. The device generally comprises means for securely attaching a camera to the device, e.g., a camera connecting component, and means for slidably receiving a strap connectable to the camera attaching means, e.g., a strap receiving component. The camera connecting component may comprise a ball connector configured to threadably engage a camera attachment point on the camera and a second ball end and the strap receiving component may comprise a strap receiving means configured to slidably receive a strap therethrough and a socket to receive the ball end of the ball connector. The ball and socket connection may be secured by a sleeve threadably engaging the socket in a covering relationship. Also provided is a system for engaging a camera for transport which comprises the devices provided herein, a strap and a camera which are assembled as described.

11 Claims, 19 Drawing Sheets

(56) References Cited

U.S. PATENT DOCUMENTS

| | | |
|---|---|---|
| 4,396,137 A | 8/1983 | Benjamin |
| 4,572,633 A | 2/1986 | Burke |
| 4,687,309 A * | 8/1987 | Breslau ............ 396/423 |
| 4,768,689 A | 9/1988 | Davis |
| 4,868,954 A | 9/1989 | Kasai |
| 5,065,919 A | 11/1991 | Sims |
| 5,248,176 A | 9/1993 | Fredriksson |
| 7,814,697 B2 | 10/2010 | Esch |
| 7,866,899 B2 | 1/2011 | Kope |
| 8,047,729 B2 | 11/2011 | Kope |
| 2004/0090773 A1* | 5/2004 | Bryan ............ 362/156 |
| 2006/0208016 A1 | 9/2006 | Esch |
| 2008/0061099 A1 | 3/2008 | Tilby |
| 2008/0292303 A1* | 11/2008 | Kope et al. ............ 396/423 |

FOREIGN PATENT DOCUMENTS

| | | |
|---|---|---|
| JP | 200565805 A | 3/2005 |
| JP | 2006-136636 | 6/2006 |
| NL | 1019969 | 8/2003 |

OTHER PUBLICATIONS

Neck Strap Attachment for Small Camera, Popular Science, vol. 128, No. 4, Apr. 1936, pp. 86-87.
Office Action in U.S. Appl. No. 13/317,576, pp. 2-8, Apr. 9, 2013, USPTO.†
Novoflex QPL-AT2 1/4 Camera Plate with Twist Protection—R Strap compatible, printed Jun. 25, 2013 (as published for sale Mar. 15, 2007 and Aug. 12, 2010), http://EnjoyYourCamera.com.†

\* cited by examiner
† cited by third party

SYSTEMS AND DEVICES FOR SECURING AND SECURELY TRANSPORTING A CAMERA

CROSS-REFERENCE TO RELATED APPLICATIONS

This continuation-in-part application claims benefit of priority under 35 U.S.C. §120 of pending non-provisional application U.S. Ser. No. 13/316,576, filed Oct. 21, 2011, the entirety of which is hereby incorporated by reference.

BACKGROUND OF THE INVENTION

1. Field of the Invention

The present invention relates generally to the fields of photography and camera accessories or equipment. More specifically, the present invention relates to a system for securing and securely transporting a camera while providing ease of access thereto and use thereof.

2. Description of the Related Art

Photographers routinely carry their cameras with them to be ready for any opportune shot that occurs. However, this is often a trade-off between ease of access to the camera and safe and secure transportation thereof. One solution is to affix the camera to a strap, such as is worn over the shoulder and across the chest.

For example, a carabiner-like or other type of hooking or clipping mechanism can clip to a ring on the camera and receive a strap. Alternatively, U.S. Pat. No. 7,866,899 discloses a single coupler which has a threaded end and locknut at one end to screw into the camera and a strap attachment means through which the strap passes at the other end. However, all these types of coupling mechanisms allow the camera to swing and rotate. Moreover, with the coupler disclosed in U.S. Pat. No. 7,866,899 the swinging, twisting and handling the camera undergoes may cause the screw/locknut mechanism to loosen and wear out which leaves the camera unsecured and at risk of dropping. Furthermore, to mount the camera on a tripod or other stand, part or all of the coupling mechanism must be removed first. This is an inconvenience for the photographer and leaves the camera unsecured.

Thus, there is a recognized need in the art for improved means for safely carrying a camera Particularly, the prior art is deficient in systems, devices and methods for safely and securely transporting a camera without having to release the camera from the transport system for use. The present invention fulfills this longstanding need and desire in the art.

SUMMARY OF THE INVENTION

The present invention is directed to a system for camera transport. The system comprises a mount plate with a plurality of threaded openings and a slot therethrough and a strap connector having a connecting end and a strap receiving end configured to slidably receive a strap therethrough, one or more mount plate connectors and a camera connector. The one or more mount plate connectors each have a first threaded end configured to threadably engage one or more of the plurality of threaded openings and a second end configured to connect to the connecting end of the strap connector. The camera connector has a first threaded end configured to threadably engage a threaded camera attachment point on a camera through the slot. In a related invention, the camera transport system further comprises a strap slidably passed through the strap receiving end of the strap connector. In another related invention the camera transport system further comprises a camera threadably engaged with the mount plate through the slot via the threaded camera connector.

The present invention also is directed to a device for engaging a camera for transport thereof. The device comprises a mount plate having four threaded openings and a slot therethrough, a camera connector and at least one ball connector. The camera connector has a size and dimension to threadably engage a camera attachment point on a camera whereby the camera connector is threadably received through the slot. Each of the ball connectors has a first threaded end configured to threadably engage one of the threaded openings through the mount plate and a second ball end. In a related invention the device further comprises a strap connector with a connecting end configured to receive the ball end of the ball connector and with a strap receiving end configured to slidably receive a strap therethrough and the strap slidably passed through the strap receiving end.

The present invention is directed further to a system for engaging and transporting a camera. The system comprises a mount plate having four threaded openings and a slot therethrough, a camera connecting screw, at least one ball connector, a strap connector, a strap and the camera. The camera connecting screw has a size and dimension to threadably engage a camera attachment point on the camera through the slot. The camera connecting screw has a screw head with an upper surface that is level with an upper surface of the mount plate or recessed within the slot when the screw is threadably engaged with the camera attachment point. Each of the ball connectors has a first threaded end configured to threadably engage one of the threaded openings through the mount plate and a second ball end. The strap connector has a connecting socket end configured to receive the second ball end of one of the ball connectors and a strap receiving end configured to slidably receive a strap therethrough. The strap is slidably passed through the strap receiving end and the camera is threadably engaged with the mount plate.

The present invention is directed further still to a device for camera transport. The device comprises means for securely attaching a camera to the device and means for slidably receiving a strap connectable to said camera attaching means. In a related invention the device further comprises a strap slidably passed through a strap receiving means on the strap receiving component.

The present invention is directed further still to a device for engaging a camera for transport thereof. The device comprises a ball connector configured to engage a camera attachment point on the camera and a second ball end and a strap receiving component configured to slidably receive a strap therethrough at a first end and to receive the ball connector at a second end. In a related invention the device further comprises a strap, as described supra.

The present invention is directed further still to a system for engaging and transporting a camera. The system comprises a camera connecting device having a first component configured to threadably engage the camera at a threaded camera attachment point and a second component, which is connected to the first component, that is configured to slidably receive a strap therethrough. The system also comprises the strap that is slidably received by the second component of the camera connecting device and the camera that is threadably engaged with the first component of the camera connecting device. In a related invention the device further comprises a strap, as described supra.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

FIGS. 5A-5B depict the camera coupled to the system with the lens facing to the rear and to the front. FIGS. 5C-5D depict the user initially taking hold of the camera prior to raising it to take a picture and the user having raised the camera to his eye to take a picture.

FIG. 9A depicts the camera coupled to the engagement component of the connector with the lens facing to the front. FIG. 9B depicts the user with the camera raised to his eye to take a picture.

DETAILED DESCRIPTION OF THE INVENTION

Figure 1A:
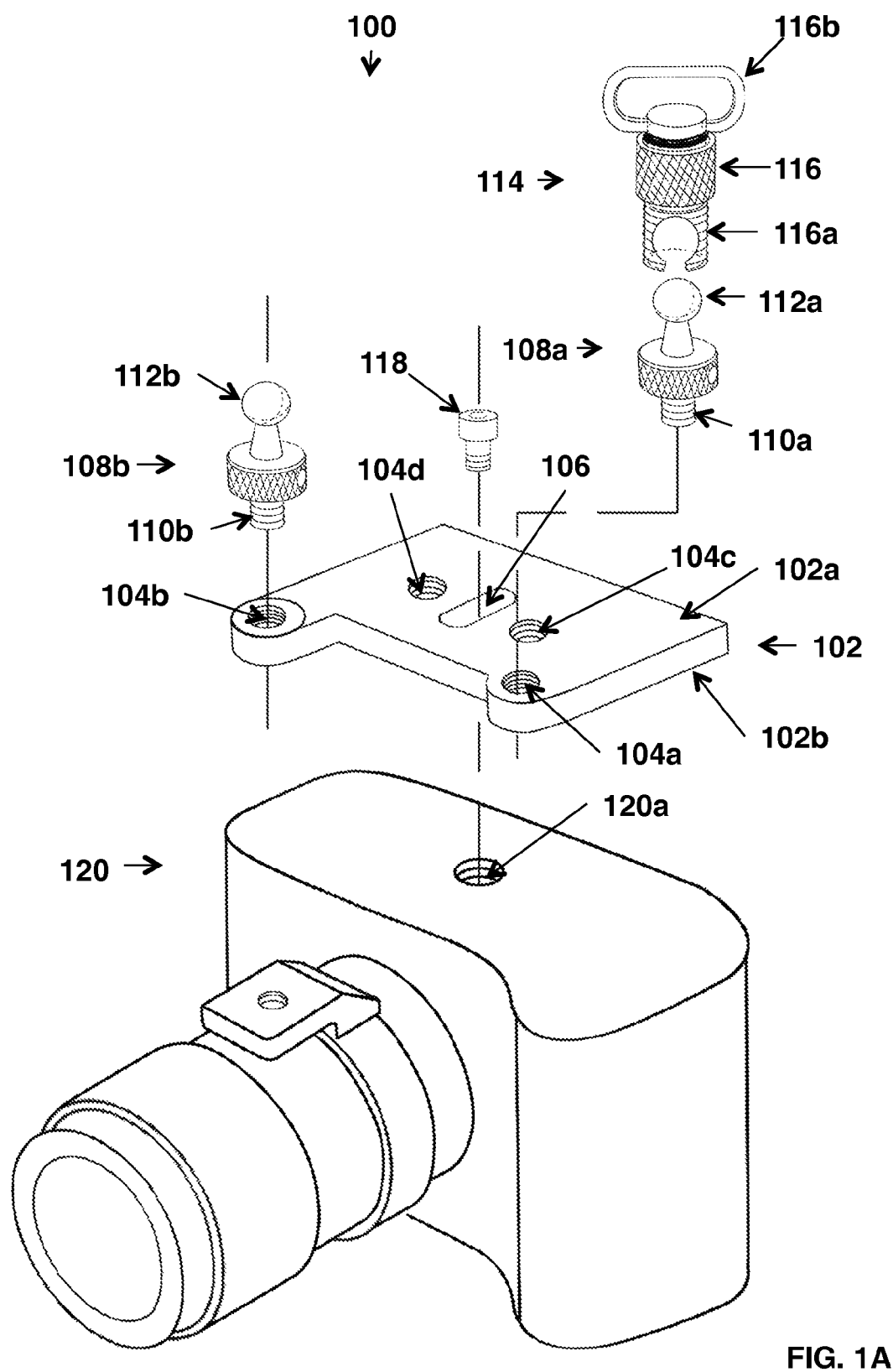
FIGS. 1A-1B are perspective views of an exploded assembly of a camera and mounting plate depicted with first and second ball connectors and strap connector (FIG. 1A) and without the first ball connector and strap connector (FIG. 1B) as aligned with a camera.

As used herein the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

In one embodiment of the present invention there is provided a system for camera transport, comprising a mount plate with a plurality of threaded openings and a slot therethrough; a strap connector having a connecting end and a strap receiving end configured to slidably receive a strap therethrough; one or more mount plate connectors each having a first threaded end configured to threadably engage one or more of the plurality of threaded openings and a second end configured to connect to the connecting end of the strap connector; and a camera connector having a first threaded end configured to threadably engage a threaded camera attachment point on a camera through the slot.

Further to this embodiment the camera transport system may comprise a strap slidably passed through the strap receiving end of the strap connector. In another further embodiment the camera transport system may comprise a camera threadably engaged with the mount plate through the slot via the threaded camera connector.

In all embodiments the mount plate may have a flat lower surface with a length and a width that are substantially accommodated by a bottom surface of the camera. In one aspect of these embodiments the mount plate slot may be centrally disposed through the mount plate where the mount plate may comprise four mount plate openings. In this aspect two of the mount plate openings may be disposed on either side of the mount plate slot and two of the mount plate openings may be disposed at opposite ends of a front edge of the mount plate. In another aspect of these embodiments the mount plate may comprise one or two ball connectors each having a threaded end and a ball end threadably engaged with one or two threaded mount plate openings; a strap connector with a socket connecting end connected to the ball end of one of the ball connectors and a strap receiving end through which a strap is slidably passed; and a screw configured to threadably engage the threaded camera attachment point through the mount plate slot. In this other aspect the two mount plate openings may be disposed at opposite ends of a front edge of the mount plate.

In all embodiments the one or more mount plate connectors may be ball connectors where the second end comprises a ball configured to connect to the connecting end of the strap connector. As such, the connecting end of the strap connector may be a socket configured to receive a ball end of a ball connector. Also, in all embodiments the camera connector may be a screw having a screw head with a size and dimension whereby an upper surface of the screw head is level with an upper surface of the mount plate or recessed within the slot when the screw is threadably engaged with the camera attachment point.

In another embodiment of the present invention there is provided a device for engaging a camera for transport thereof, comprising a mount plate having four threaded openings and a slot therethrough; a camera connector of a size and dimension to threadably engage a camera attachment point on a camera, said camera connector threadably received through the slot; and at least one ball connector having a first threaded end each configured to threadably engage one of the threaded openings through the mount plate and a second ball end.

Further to this embodiment the device comprises a strap connector having a connecting end configured to receive the ball end of the ball connector and a strap receiving end configured to slidably receive a strap therethrough; and the strap slidably passed through the strap receiving end. In both embodiments the mount plate slot may be centrally disposed through the mount plate. In one aspect two mount plate openings may be disposed on either side of the mount plate slot and two mount plate openings may be disposed at opposite ends of a front edge of the mount plate. Also in both embodiments, the mount plate has a flat lower surface with a length and a width that are substantially accommodated by a bottom surface of the camera.

In yet another embodiment of the present invention there is provided a system for engaging and transporting a camera, comprising a mount plate having four threaded openings and a slot therethrough; a camera connecting screw of a size and dimension to threadably engage a camera attachment point on a camera through the slot, said screw having a screw head with an upper surface that is level with an upper surface of the mount plate or recessed within the slot when the screw is threadably engaged with the camera attachment point; at least one ball connector having a first threaded end each configured to threadably engage one of the threaded openings through the mount plate and a second ball end; a strap connector having a connecting socket end configured to receive the second ball end of one of the ball connectors and a strap receiving end configured to slidably receive a strap therethrough; the strap slidably passed through the strap receiving end; and the camera threadably engaged with the mount plate.

In this embodiment the mount plate slot may be centrally disposed through the mount plate where two of the mount plate openings may be disposed on either side of the mount plate slot and two of the mount plate openings may be disposed at opposite ends of a front edge of the mount plate. Also, the mount plate may have a flat lower surface with a length and a width that are substantially accommodated by a bottom surface of the camera. In an aspect of this embodiment the mount plate may comprise a ball connector threadably engaged with one of the two mount plate openings on the front edge of the mount plate where the strap connector is connected to the ball end of one of the two ball connectors.

In yet another embodiment of the present invention there is provided device for camera transport, comprising means for securely attaching a camera to the device; and means for slidably receiving a strap connectable to said camera attaching means. Further to this embodiment the device may comprise a strap slidably passed through a strap receiving means on the strap receiving component. In a representative example the strap may be adjustable and comprise means for adjusting the length thereof.

In both embodiments the camera attaching means may comprise a camera connecting component of the device which has a first threaded end and a second ball end. A representative example the camera connecting component is a ball connector. Also, in both embodiments the strap receiving means may be a strap receiving component of the device having a strap receiving end, a socket end and a sleeve movably disposed between the ends and configured to cover the socket end. In an aspect of these embodiments the socket end may be threaded on an outer surface and the sleeve may be threaded on an inner surface where the sleeve is configured to threadably engage the threaded socket in a covering relationship.

Alternatively, the device may comprise a strap receiving component with a strap receiving means having a first end configured to slidably receive a strap therethrough and a socket threaded on an outer surface comprising a second end; a camera connecting component having an end configured to engage a threaded camera attachment point and a ball end received within the socket end; and a sleeve threaded on an inner surface and movable between the first and second ends of the strap receiving component and threadably engaging the threaded socket in a covering relationship.

In yet another embodiment of the present invention there is provided device for engaging a camera for transport thereof, comprising a ball connector configured to engage a camera attachment point on the camera and a second ball end; and a strap receiving component configured to slidably receive a strap therethrough at a first end and to receive the ball connector at a second end. Further to this embodiment the device may comprise a strap or an adjustable strap, as described supra.

In both embodiments the ball connector may have a threaded end configured to threadably engage the camera attachment point and a ball end configured for receiving by the second end of the strap receiving component. Also, the strap receiving component may comprise a strap receiving means at the first end, a socket threaded on an outer surface at the second end and a sleeve threaded on an inner surface movably disposed between the first and second ends where the threaded sleeve is configured to threadably engage the threaded socket in a covering relationship upon receiving the ball end of the ball connector within the threaded socket.

In yet another embodiment of the present invention there is provided system for engaging and transporting a camera, comprising a camera connecting device having a first component configured to threadably engage the camera at a threaded camera attachment point and a second component, connected to said first component, configured to slidably receive a strap therethrough; the strap slidably received by the second component of the camera connecting device; and the camera threadably engaged with the first component of the camera connecting device.

In both embodiment the first component may comprise a threaded end and a ball end. A representative example of the first component is a ball connector. Also, in these embodiments the second component may comprise a strap receiving means, a socket threaded on an outer surface and means for securing the connection between the first and second components. In an aspect of this embodiment the means for securing the connection between the first and second components may be a sleeve having threads on an inner surface thereof movably disposed between the strap receiving means and the threaded socket, where the sleeve is configured to threadably engage the threaded socket in a covering relationship upon its connection to the first component. Particularly, the connection between the first and second components may comprise a ball end of a ball connector within the threaded socket. In all embodiments and aspects thereof the strap may be an adjustable strap comprising means for adjusting the length thereof.

Provided herein are a device and system for carrying or transporting a camera. In one system a camera mount plate device is utilized as a means to engage a camera at an attachment point generally used for mounting the camera onto a tripod or other stand. Moreover, the mount plate comprises separate means for engaging the camera and for slidably receiving a strap for carrying the same. This provides a more secure and safe method of transport without interfering with use of the camera by a user while allowing the camera to be comfortably positioned against the user either at rest or during transport. Furthermore, the secured camera may be mounted onto a tripod or other stand without having to disengage the camera from the mount plate.

In a related camera carrying or transporting system, the means for slidably receiving the strap to carry the camera is utilized to directly engage the camera at the attachment point without the camera mount plate device. Particularly, a device comprising a camera connecting component and a strap receiving component can engage a camera at the camera attachment point. The two components comprising the camera engagement device are joined via a ball in socket assembly, such as in a ball connector. When the strap receiving component has a strap slidably received therethrough, the assemblage comprises a camera transport system.

One advantage of this type of camera transport system is that, utilizing a ball and socket assembly, the attached camera can be rotated to a position suitable and comfortable for a particular user either at rest or during transport of the camera and without interfering with a user's ability to quickly take advantage of a photographic opportunity. Moreover, moving, swinging or rotating the camera via the ball and socket assembly eliminates any rotational forces or torque that would loosen the camera connecting component from the camera attachment point. This enables the safe transport and use of the camera.

As described below, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

Figure 1B:
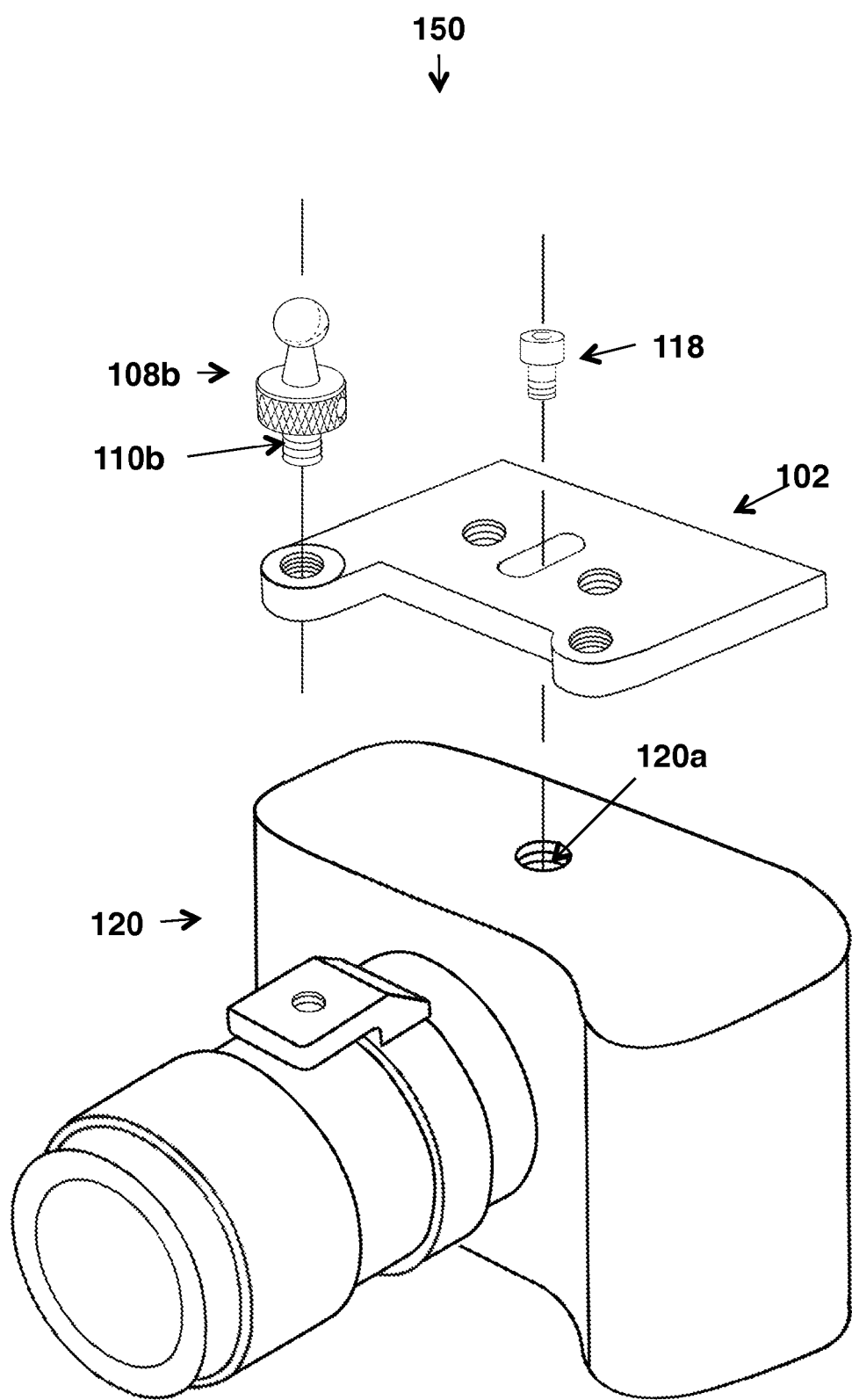

FIG. 1A is an exploded perspective view of the mount plate and the strap connector of the camera transport system 100 as it would be aligned to engage and to secure a camera. A mount plate 102 is shown and has an upper 102a and a lower 102b surface with a plurality of threaded openings 104a,b,c,d and a slot 106 therethrough. Threaded openings 104a,b are disposed at opposite ends of a front edge 102c and threaded opening 104c,d are disposed on either side and proximate to slot 106. First and second ball connectors 108a,b each have a threaded end with nut assembly 110a,b to threadably engage one of the threaded openings in the mount plate and a ball end 112a,b to connect to a strap connector 114. The strap connector comprises a sleeve 116 with a socket 116a configured to receive the ball of the ball connector at a first end and a strap receiving means 116b for slidably passing a strap 202 therethrough (see FIG. 2A) threadably engaged with the sleeve at a second end. A camera connecting screw 118 is configured to threadably engage the threaded camera attachment point 120a on the bottom surface of the camera typically provided for mounting the camera onto a tripod or other stand through the mount plate slot. With continued reference to FIG. 1A, FIG. 1B is an exploded perspective view 150 of the mount plate 102, camera connecting screw 118 and the second ball connector 110b as aligned with threaded camera attachment point 120a on the bottom surface of the camera 120.

The dimensions of the mount plate are determined by the dimensions of the bottom surface of the camera so that the lower surface area of the mount plate is flush with and substantially accommodated by the bottom surface of the camera. For example, although any surface area for the mount plate is encompassed by the invention, a representative areal dimensions of the mount plate may be, but are not limited to, about 7 cm to about 8 cm.

One or more of the ball connectors may be threaded into one or more of the mount plate openings and, when so engaged with the mount plate, the ball connector threaded end is flush with the lower 102b surface of the mount plate 102. Moreover, the strap connector may be connected to any ball connector 110a,b at any mount plate opening 104a,b,c,d. Preferably, the strap connector is connected to a ball connector that is itself threaded into one of the mount plate openings 104a,b. In addition, while the camera transport system described herein provides a secure means of transport that enables quick use of the camera without disengaging or releasing it from the system, including mounting the camera onto a tripod or other stand, a user who knows that the camera will not be used for a period of time, may utilize a second strap as an additional safety feature. For example, a second strap may be passed through the strap attachment end of a second strap connector engaged with a second ball connector on the mount plate. The second strap may hook to a belt loop or loop over a belt. This keeps the camera near the user and limits its motion during transport. Furthermore, the plurality of mount plate openings enables a camera to be simultaneously engaged with the mount plate and with a camera tripod or other stand, as are known in the art.

When the camera connecting screw 118 is threaded through the mount plate slot 106 into the threaded camera attachment point, the top surface of the screw head may be flush with the upper edge of the mount plate slot or recessed therein. This ensures that the screw remains securely fastened and will not be loosen over time. Loosening the camera connecting screw requires a tool, such as, depending on the type of screw head, a screwdriver, Allen wrench or hex key, as are well-known and standard in the art.

Figure 2A:
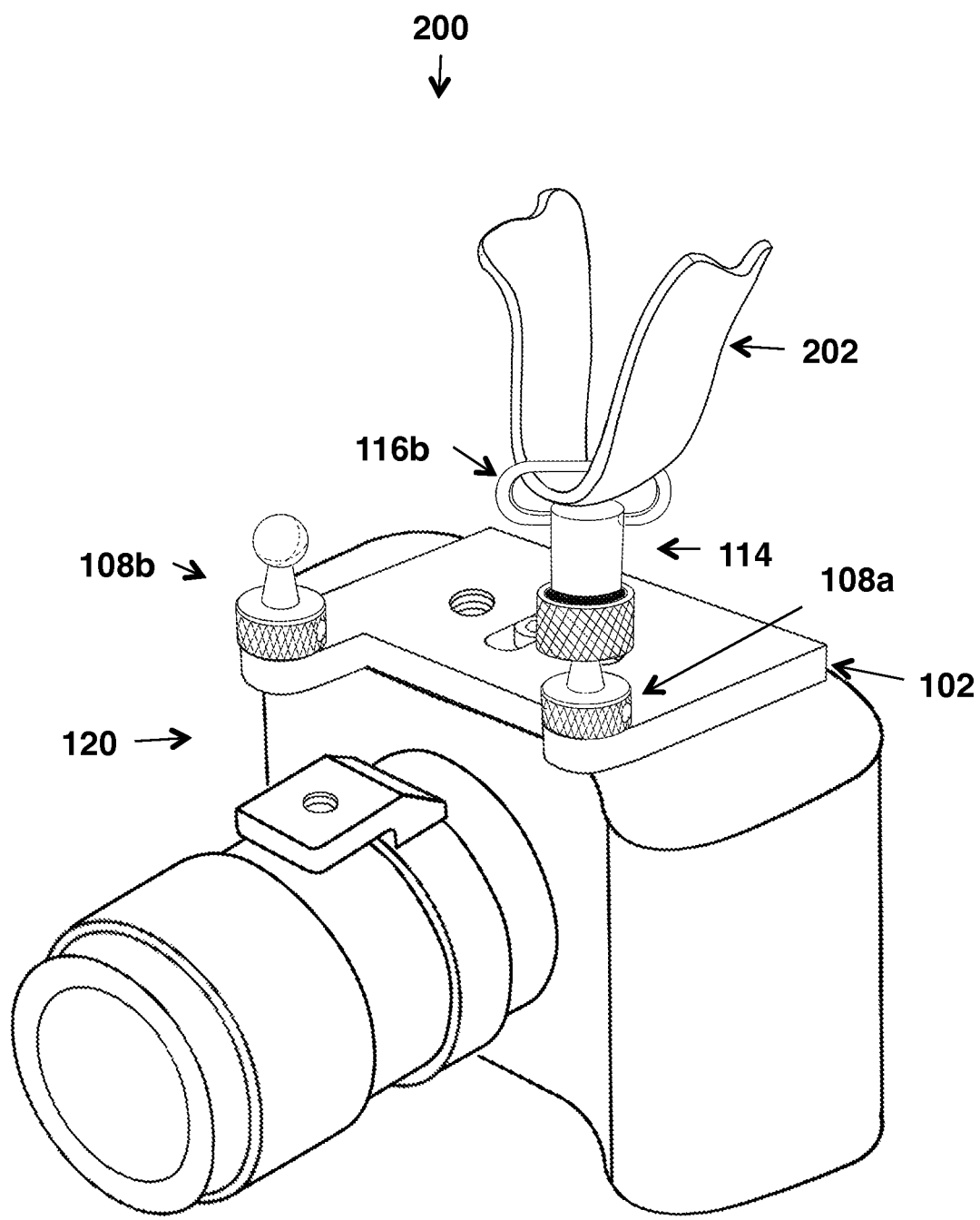
FIGS. 2A-2B are perspective views showing the system of FIG. 1A including a strap through the strap connector assembled via the first ball connector (FIG. 2A) and via the second ball connector (FIG. 2B).
Figure 2B:
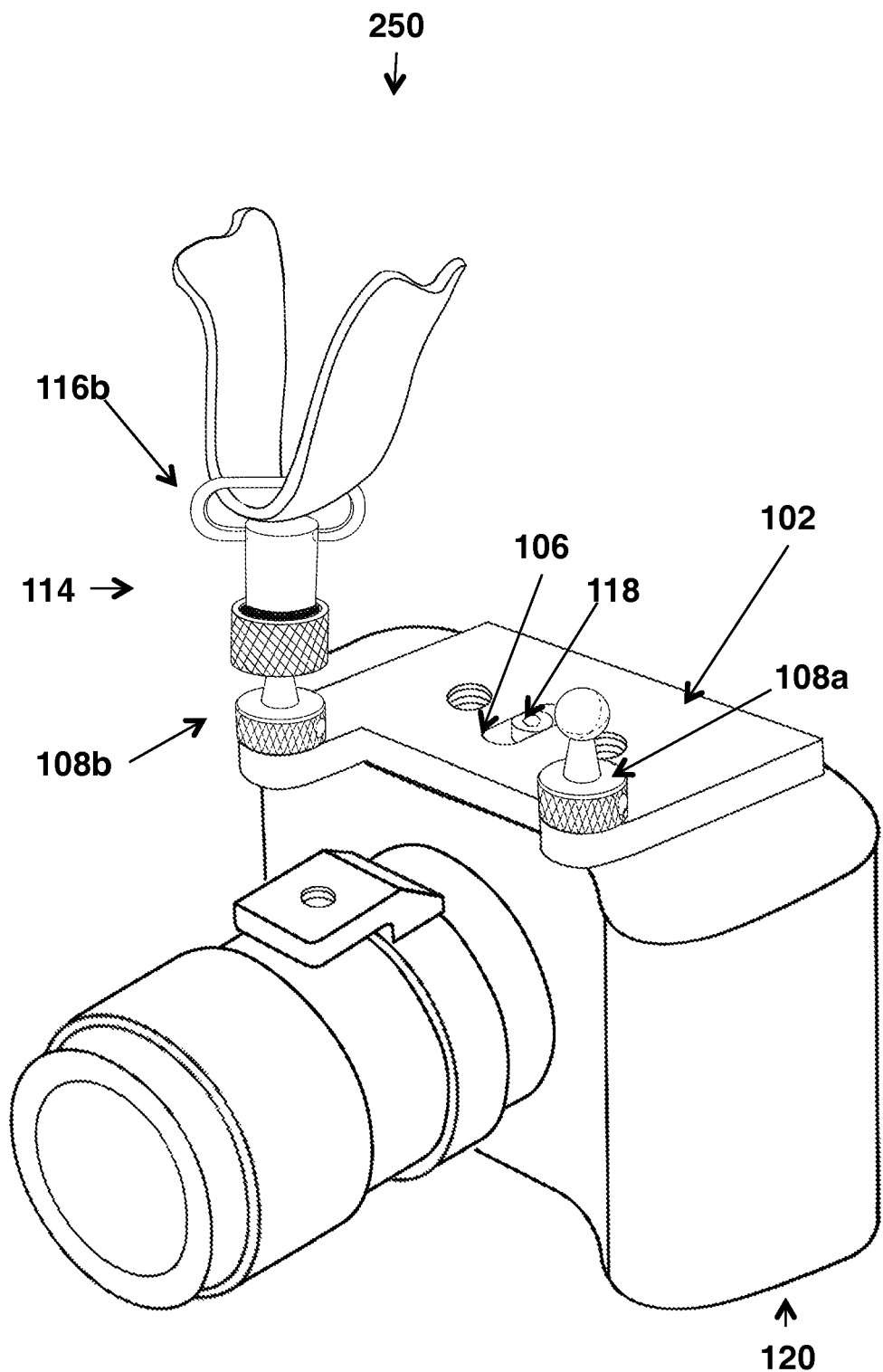

With continued reference to FIG. 1A, FIGS. 2A and 2B are front perspective views 200 and 250 of the assembled camera transport system 100. In these views, the lower surface 102b of the mount plate 102 is threadably engaged and in contact with the bottom surface of the camera 120 via the camera connecting screw 118 which is flush with the mount plate slot 106 as described for FIG. 1A-1B. The mount plate has two ball connectors 108a,b threaded into the mount plate openings 104a,b. A strap connector 114 depicting a portion of strap 202 slidably passing through the strap receiving end 116b is connected to ball connector 108a in FIG. 2A and is connected to ball connector 108b in FIG. 2B.

With continued reference to FIGS. 2A-2B, FIGS. 3A and 3B are perspective views 300 and 350 of the camera transport system in which the complete strap 202 is depicted slidably passing through the strap receiving end 116b of the strap connector 114. The strap connector is connected to ball connector 108a as described in FIG. 2A and is connected to ball connector 108b as described in FIG. 2B. The threadable engagement of the ball connectors 108a,b to the mount plate 102 and of the mount plate to the camera 120 is as described for FIGS. 2A-2B.

Figure 4A:
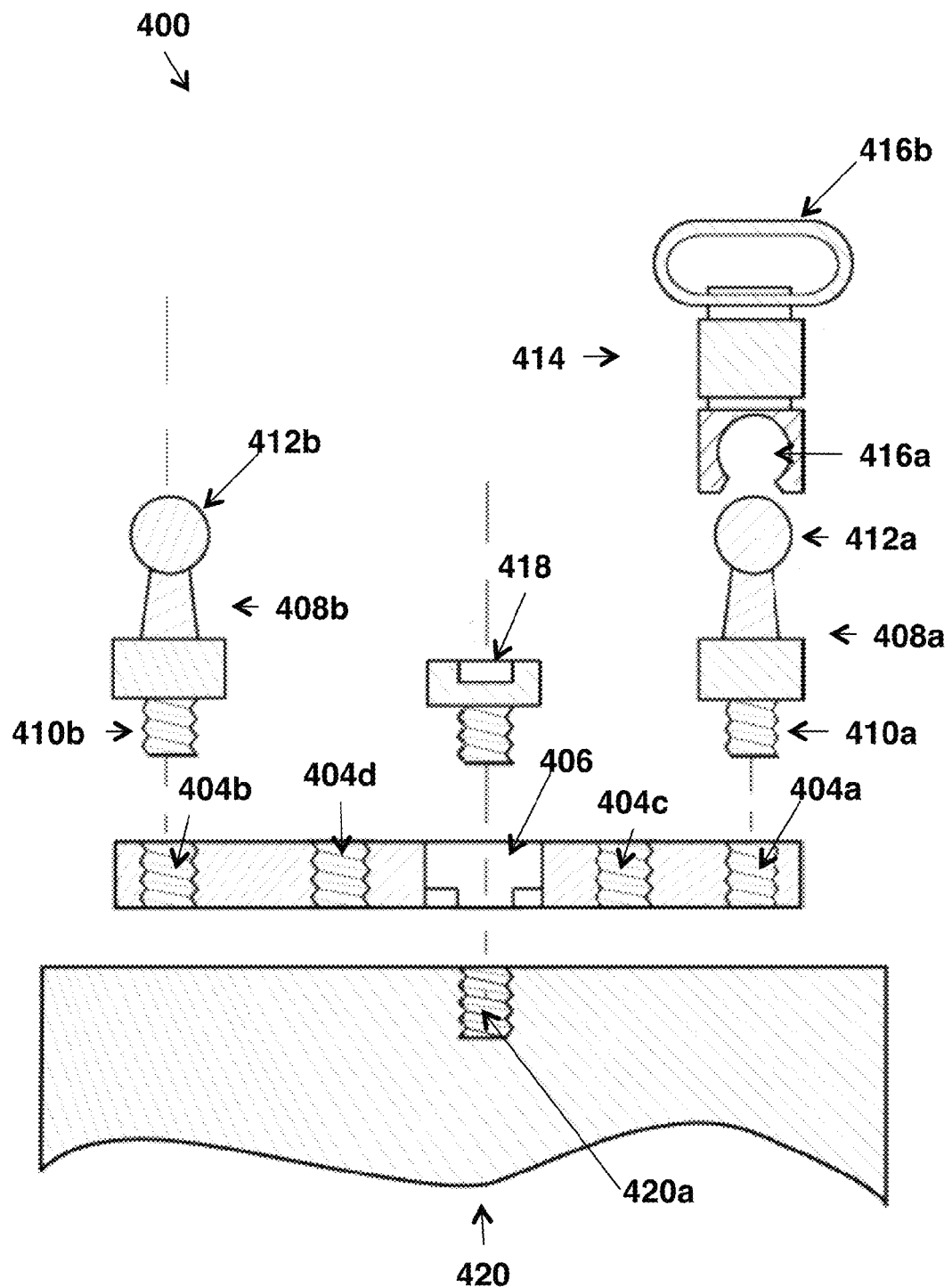
FIGS. 4A-4B are front cross-sectional views of the exploded assembly depicted in FIG. 1A and the perspective view of the assembled system shown in FIG. 2A.

With continued reference to FIG. 1A FIG. 4A is a cross-sectional view of the exploded assembly of the mount plate 402 with components shown in cross-section as aligned for engagement with the camera 420. The cross-section shows the plurality of threaded openings 404a,b.c,d on the mount plate 402 that receive the threaded ends 410a,b of the ball connectors 408a,b. The cross-section also depicts the strap connector 414 sleeve 416 showing the configuration of the socket 416a end to receive the ball end 412a of the ball connector and the configuration of the strap receiving end 416b to slidably receive the strap therethrough.

Figure 4B:
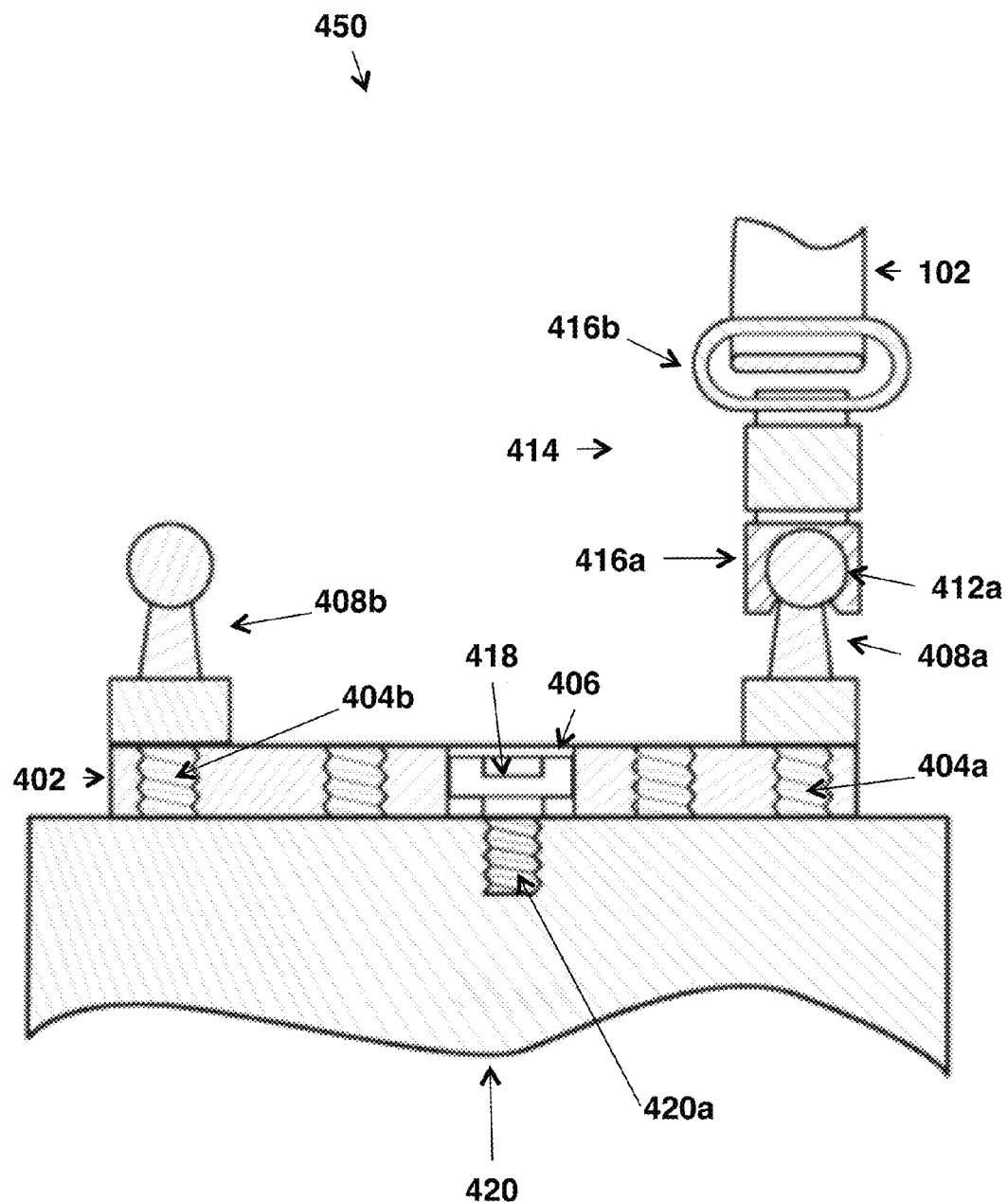

With continued reference to FIG. 2A FIG. 4B is a cross-sectional view 450 of the assembled mount plate 402 engaged with the camera 420. The cross-section shows how the ball connectors 408a,b are threadably received into the mount plate openings 404a,b. The cross-section also shows how the camera connecting screw 418 is threadably received into the camera attachment point 420a of the camera through the mount plate slot 406 and demonstrates that the screw head of the camera connecting screw is recessed within the slot for secure engagement. The cross-section further demonstrates how the ball end 412a of the ball connector 408a is received into the socket 416a of the strap connector 414 sleeve 416 and how a portion of the strap 402 slidably passes through the strap receiving end 416b of the sleeve.

Figure 3A:
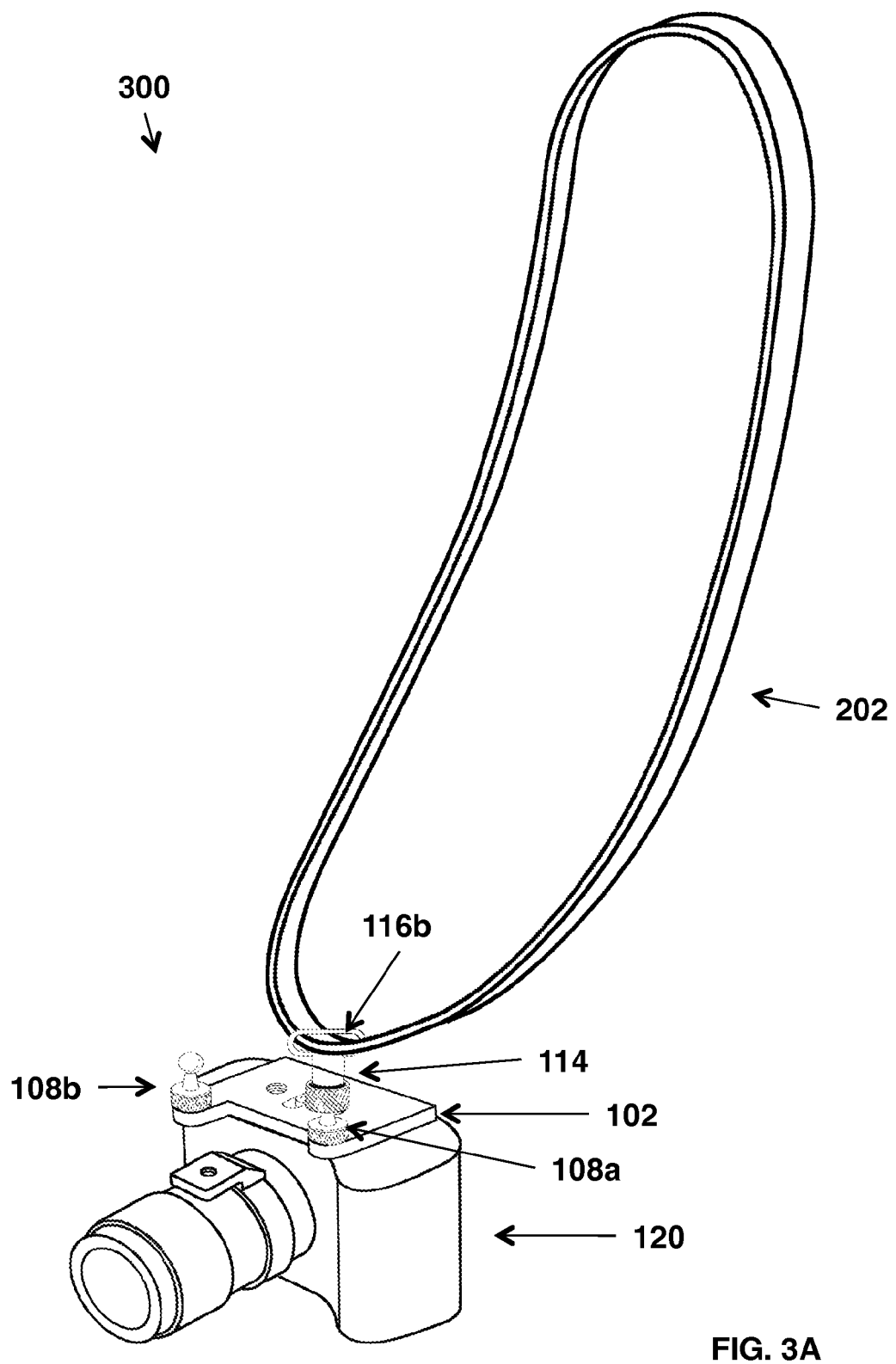
FIGS. 3A-3B are perspective views of FIGS. 2A-2B depicting a complete assembled transport system securing a camera.
Figure 3B:
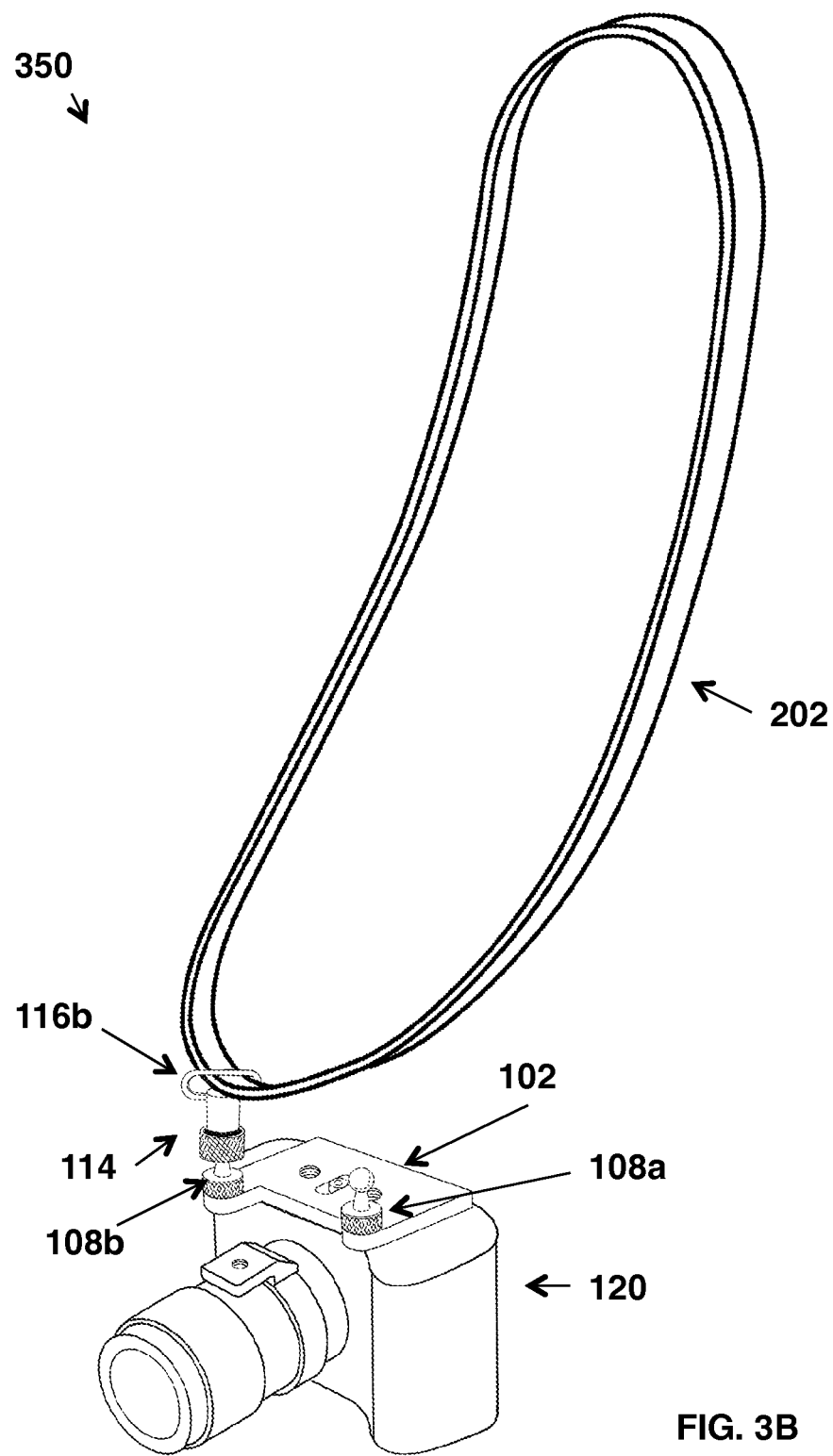

With continued reference to FIGS. 3A-3B, FIGS. 5A-5B depict the camera transport system in front plan views 500a,b, as worn and used by a user 501. The strap 202 may be worn over the shoulder 502a to cross the chest whereby the camera 120 engaged with the mount plate 102 rests in the area of the right hip 504b. The strap slidably passes through the strap receiving end 116b of the strap connector 114 and may be adjusted at 202a, for example, lengthened or shortened, as suits each individual user, so that the camera rests comfortably and securely against the user. Alternatively, the strap 202 may be of an unadjustable length, as shown in FIG. 5D. The camera transport system may engage the camera such that, when worn by the user 501, the camera is rearwardly facing at about hip level 504b at 506a, as in FIG. 5A, or forwardly facing at about hip level 504b at 506b, as in FIG. 5B. Moreover, although the strap connector is depicted connected to the ball end 112b of the ball connector 108b, the ball connector may be engaged with any of mount plate openings 104a, b,c,d. As depicted, the camera transport system is assembled for easier use by a right-handed person. As shown in FIG. 3A, if ball connector 108a is utilized to connect to the strap connector 114, the strap may be worn over shoulder 502b to cross the chest whereby the camera 120 rests against the area of the left hip 504aa of the user.

Figure 5A:
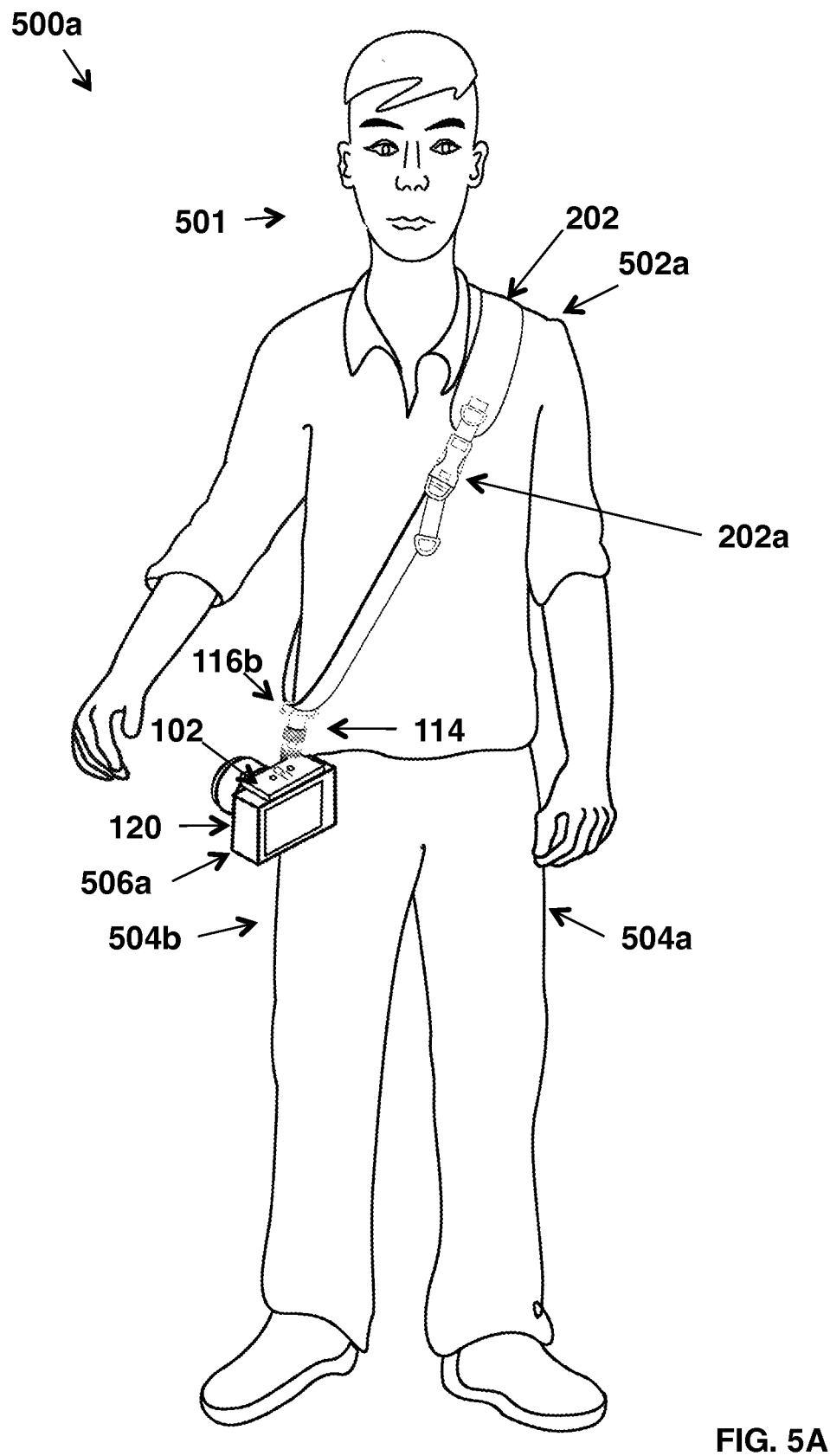
FIGS. 5A-5D depict the camera transport system with camera as worn by a user of the camera.
Figure 5B:
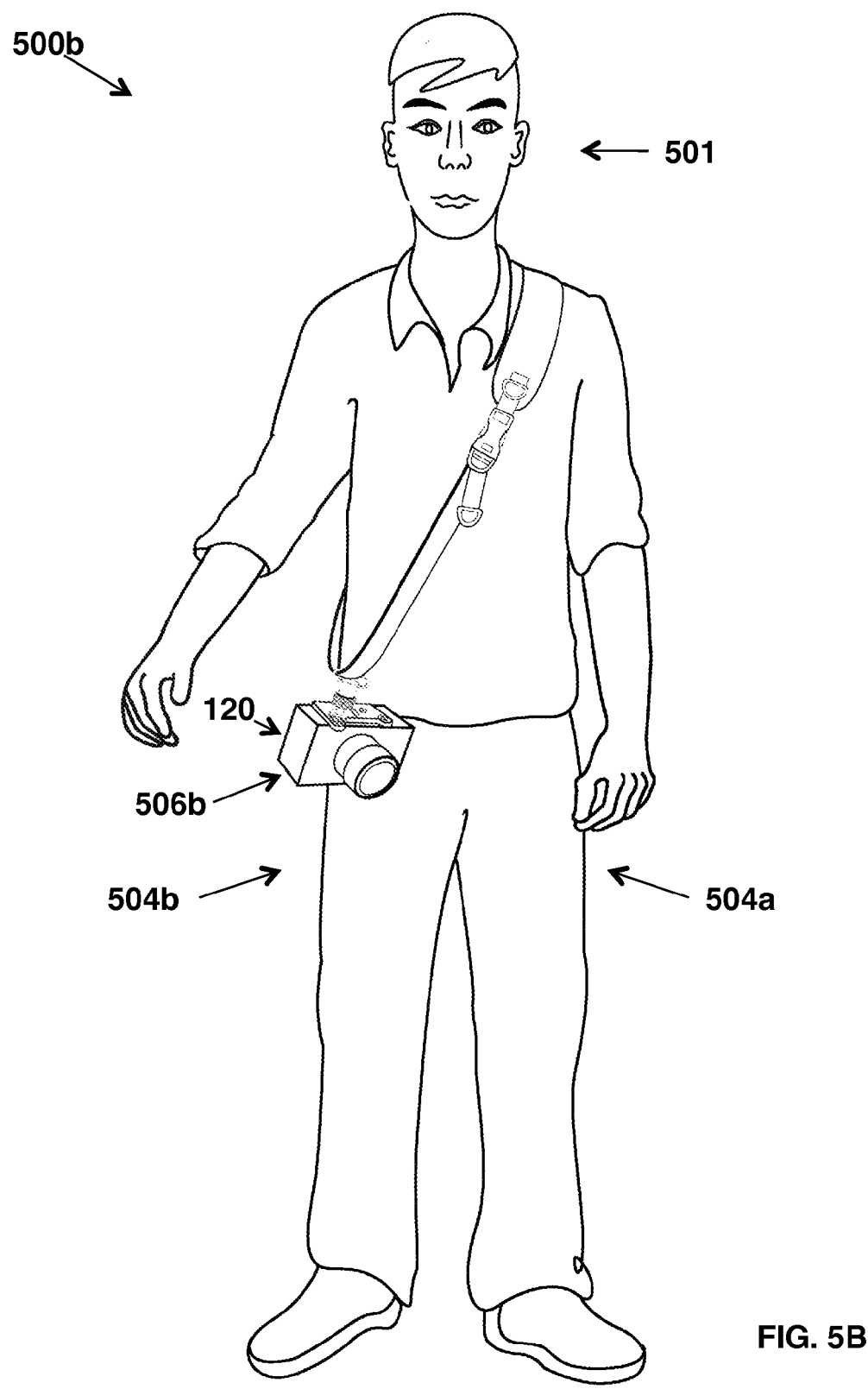
Figure 5C:
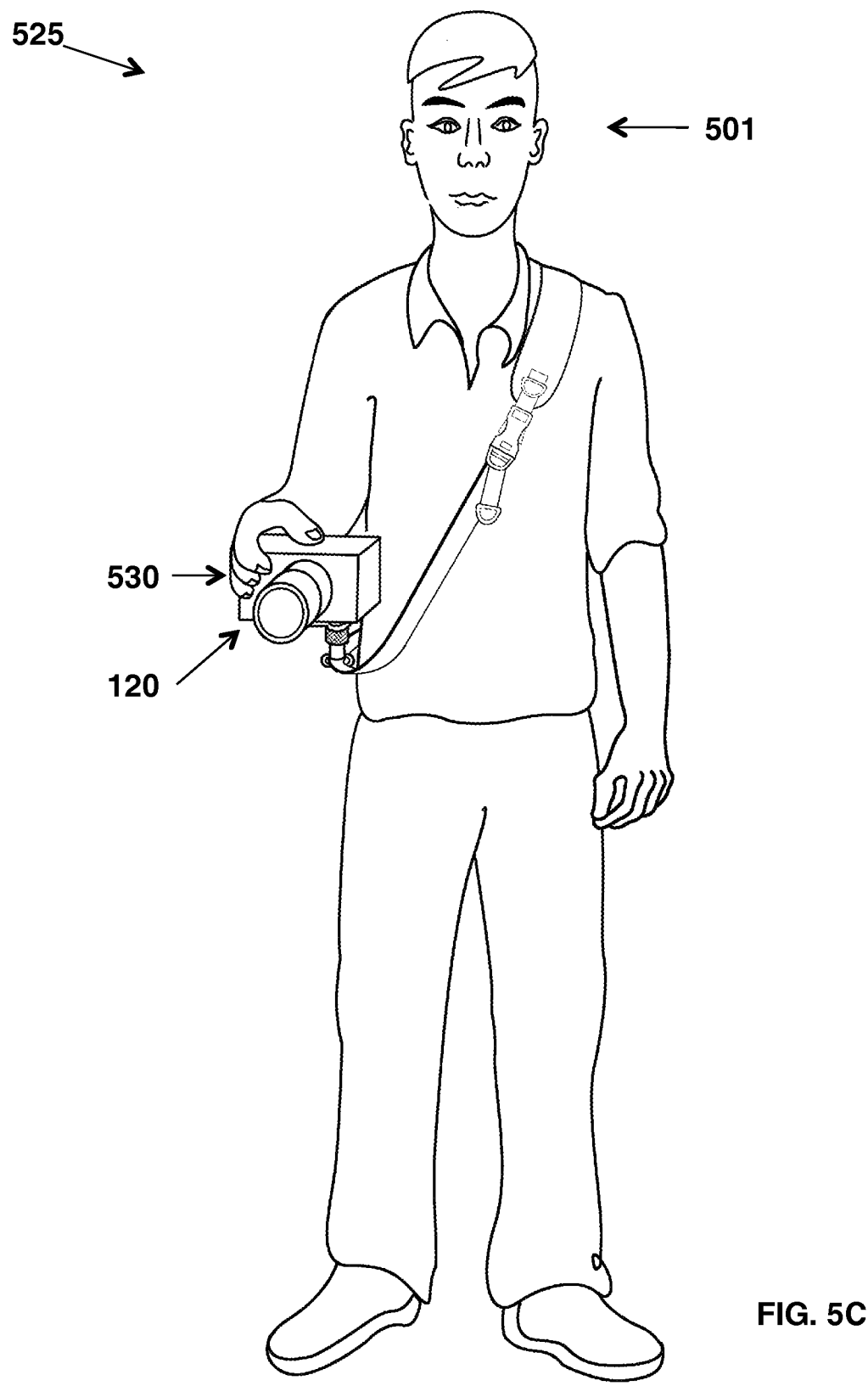
Figure 5D:
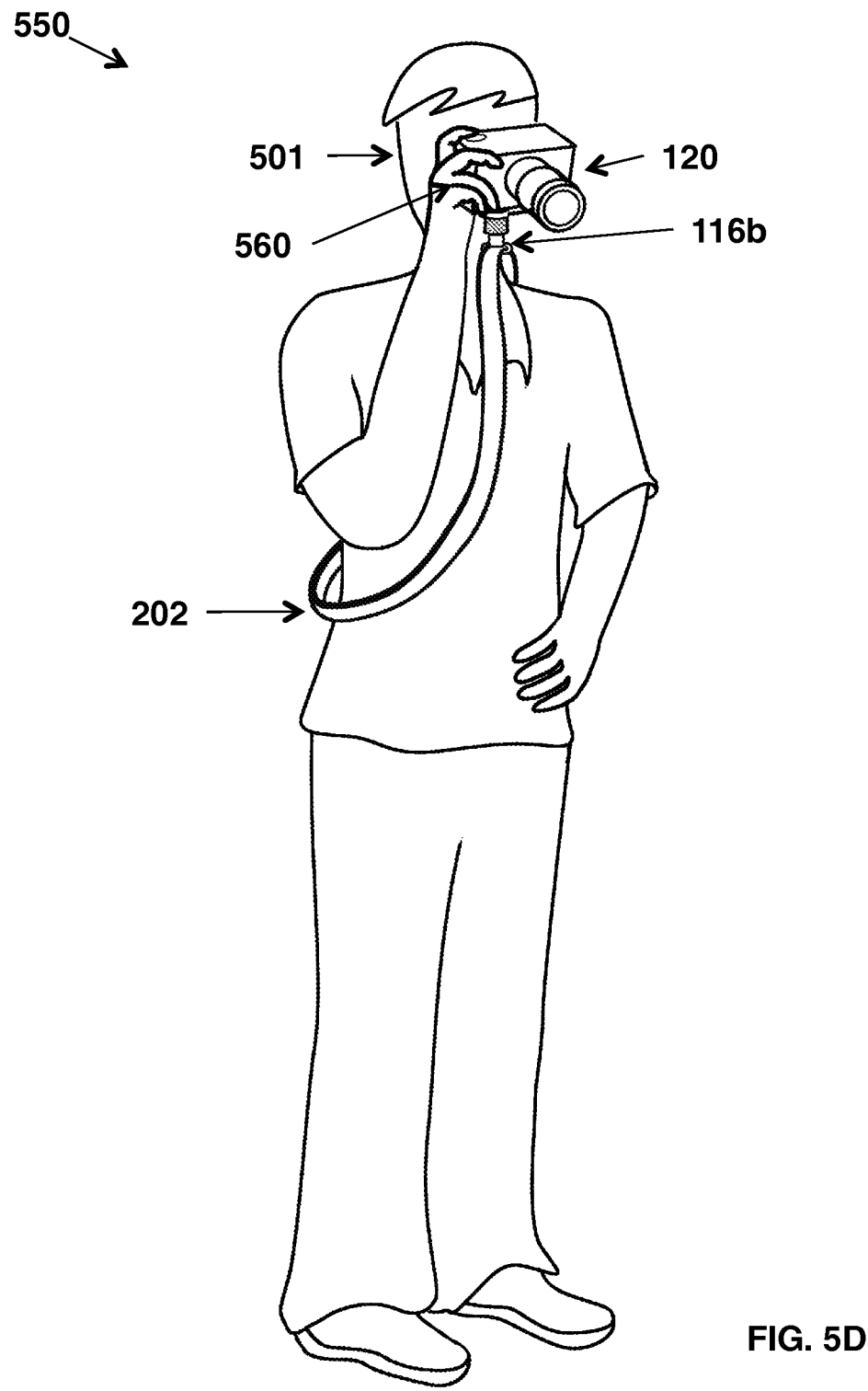

FIG. 5C is a front plan view 525 demonstrating that the user 501 can easily one-handedly grasp the camera 120 at 528, rotate it 180 degrees to hold the camera in correct orientation, i.e., the bottom of the camera is downwardly facing, and hold the camera in this orientation should the user either anticipate a photographic opportunity or in preparation to immediately take a picture. FIG. 5D is a front plan view 550 demonstrating the latter instance and showing that the user 501 has continued the upward motion to raise the camera to eye level at 560. Raising the camera to the eye may comprise one or both of sliding the strap receiving end 116b of the strap connector 114 along the length of the strap 202 or raising the camera to the eye at the position where the strap passes through the strap end. FIGS. 5A-5D clearly demonstrate that the camera can be used without having to release it from the camera transport system and that the camera transport system does not interfere with use thereof.

Figure 6A:
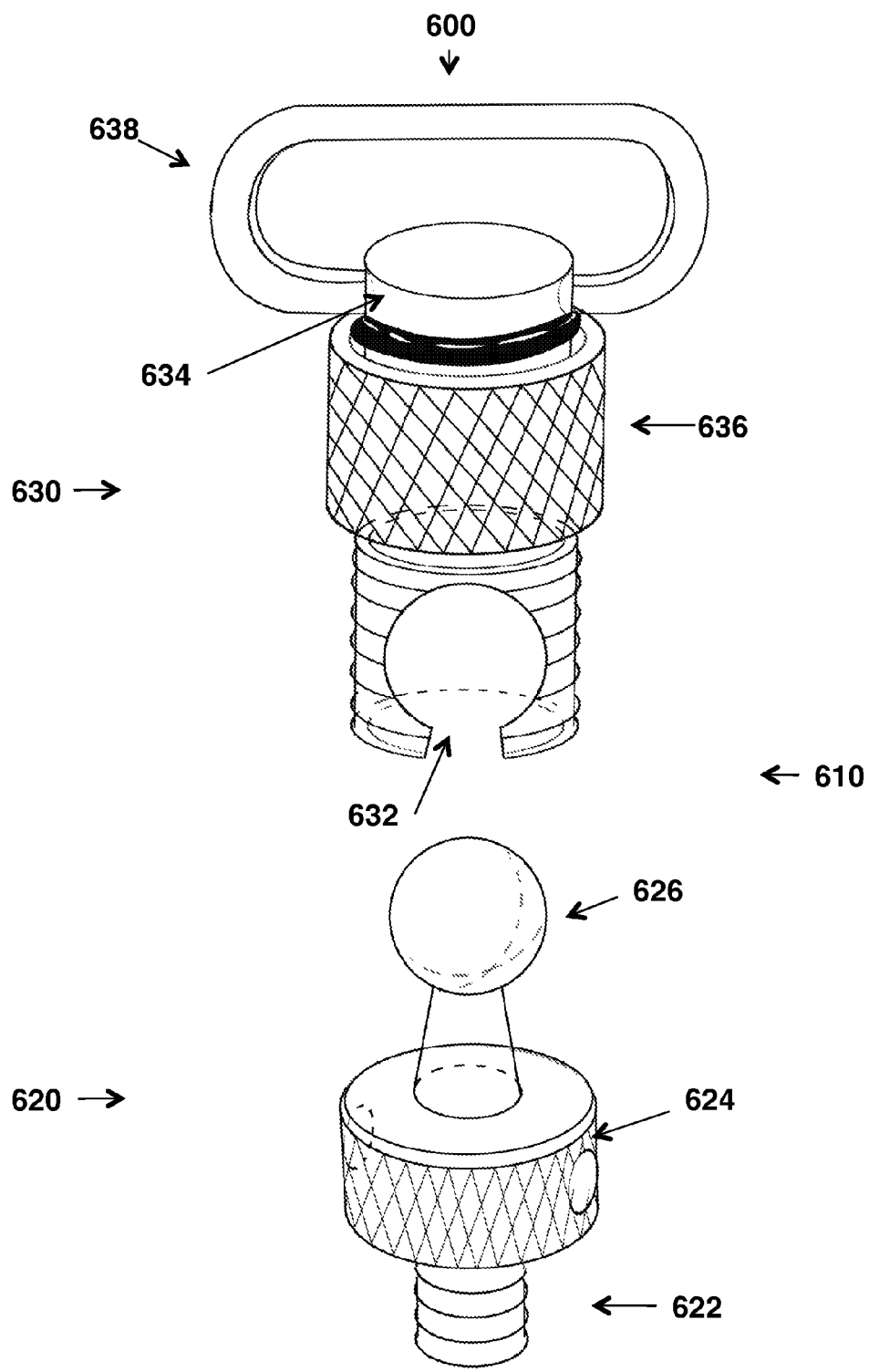
FIGS. 6A-6B are perspective views of the exploded (FIG. 6A) and the assembled (FIG. 6B) camera engagement device depicting the camera connecting component and the strap receiving component.
Figure 6B:
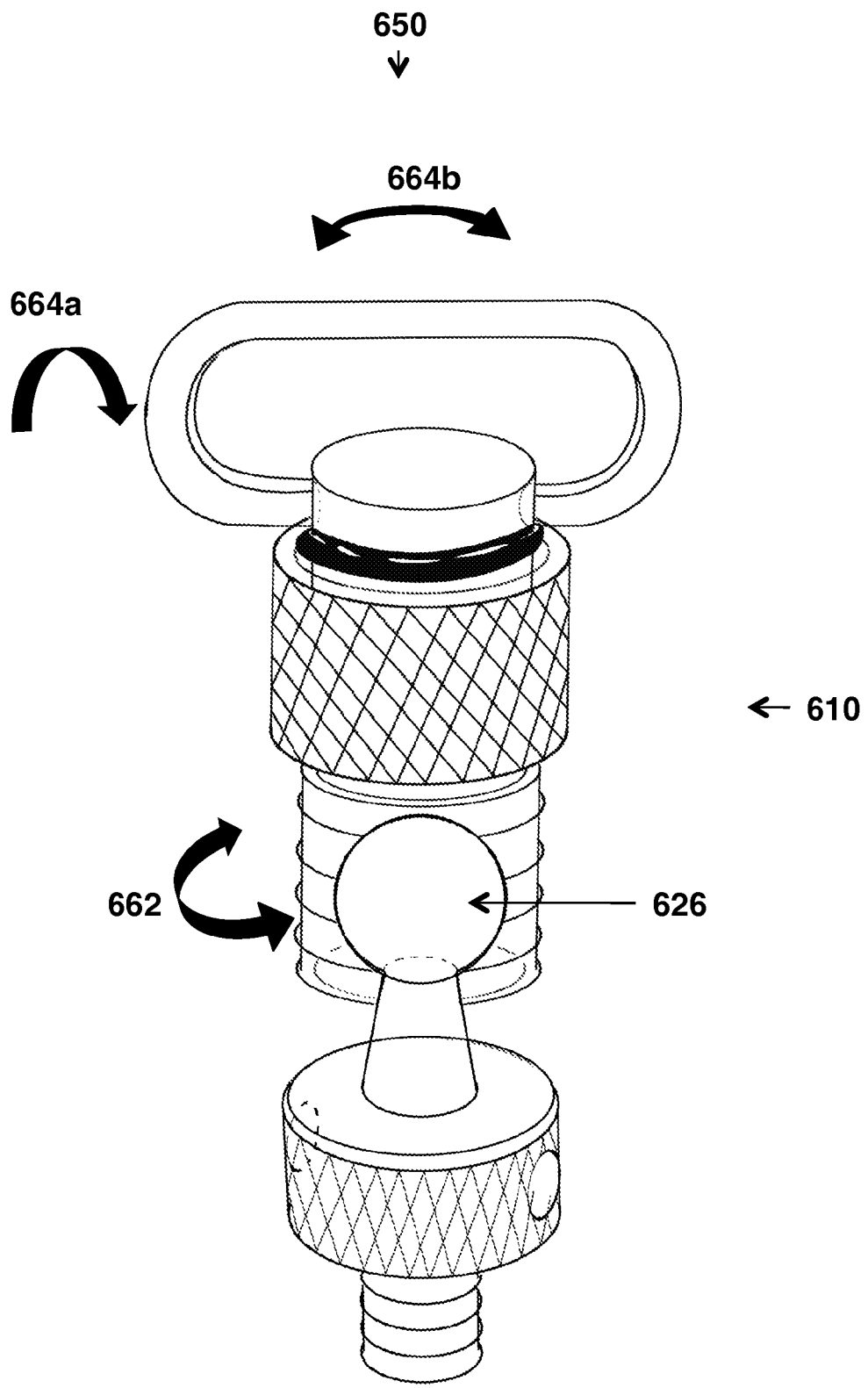

FIG. 6A is an exploded perspective view 600 of the camera engagement device 610. The device comprises two components, a camera connecting component 620 and a strap receiving component 630. The camera connecting component may be a ball connector having a threaded end 622 with nut 624 assembly and a ball end 626 to connect to the strap receiving component. The strap receiving component has an exteriorly threaded socket end 632 configured to receive the ball end of the ball connector, a strap receiving end 634 for slidably passing a strap 802 therethrough (see FIG. 8A) and an interiorly threaded sleeve 636 disposed to threadably downwardly engage the socket upon its receiving the ball end therein. The strap end comprises a strap receiving means 638 through which the strap is received. FIG. 6B is a perspective view 650 of the assembled camera engagement device 610. The view illustrates how the strap receiving component receives the ball end 626 of the camera connecting component 620 with the sleeve 638 at the strap receiving end 634. The ball end is securely and rotatably confined within socket 634 of the strap receiving component 630. As is generally known and standard in the art of ball connectors, the ball end provides a point around which the strap receiving component can pivot 360 degrees at 662 and/or tilt to and fro at 664a or side to side at 664b.

Figure 7:
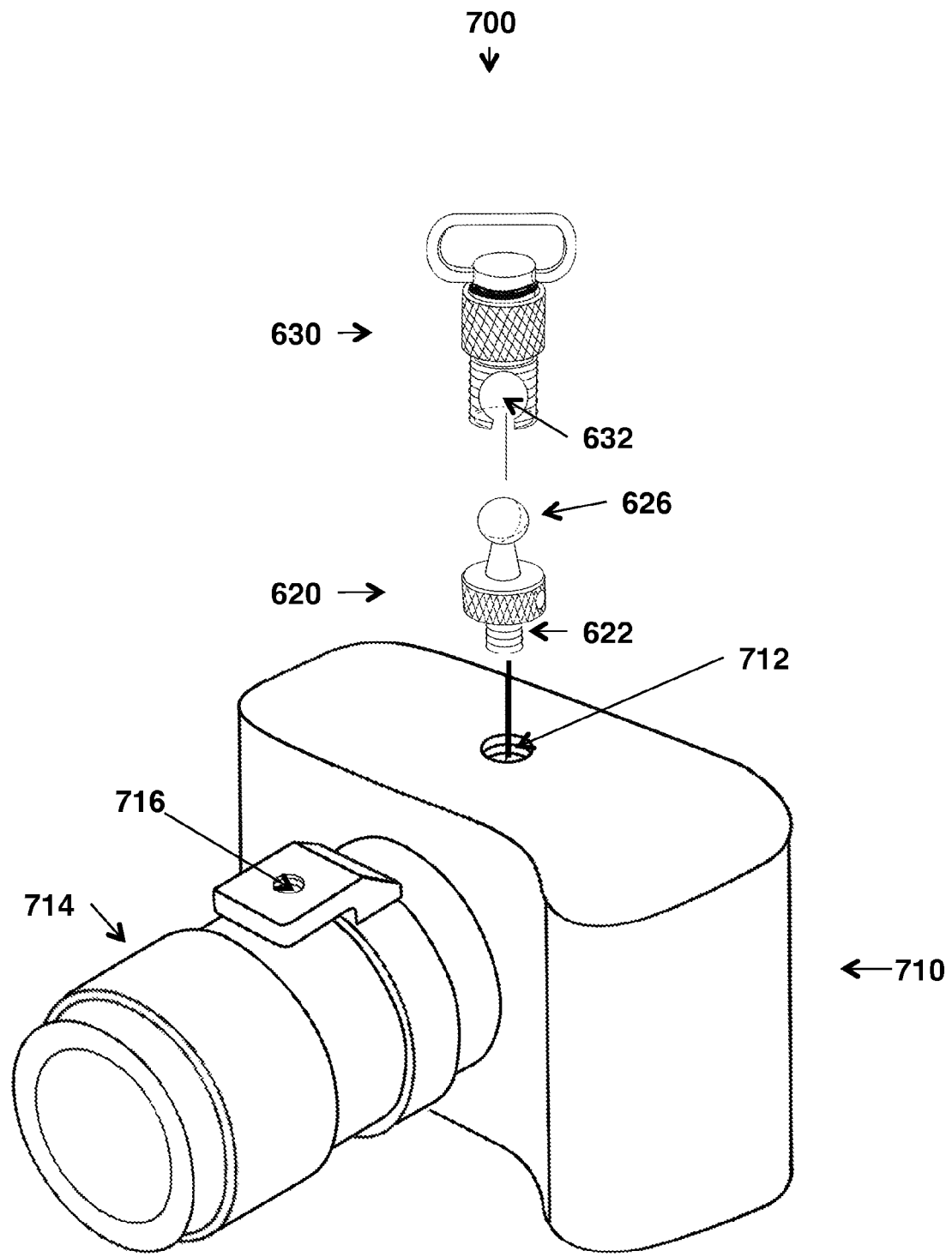
FIG. 7 is a perspective view of the exploded camera engagement device as aligned with the attachment point on a camera.

With continued reference to FIG. 6A, FIG. 7 is a perspective view 700 of the exploded camera engagement device 610 as aligned with a threaded camera attachment point 712 on the bottom surface of the camera 710. The threaded end 622 of the camera connecting component or ball connector 620 is aligned to threadably engage the threaded camera attachment point. The socket end 632 on the strap receiving component 630 aligns with the ball end 626 of the ball connector, as described. In this configuration, the camera comprises a lens 714 which has an attachment point 716 on the underside of the lens to threadably engage a suitable tripod or other support or mounting means. While the camera engagement device and system described herein is designed to carry and secure a camera for manual use while the camera is worn by a user, the configuration of the camera engagement device does not interfere with the user's mounting or securing the camera to a tripod, etc.

Figure 8A:
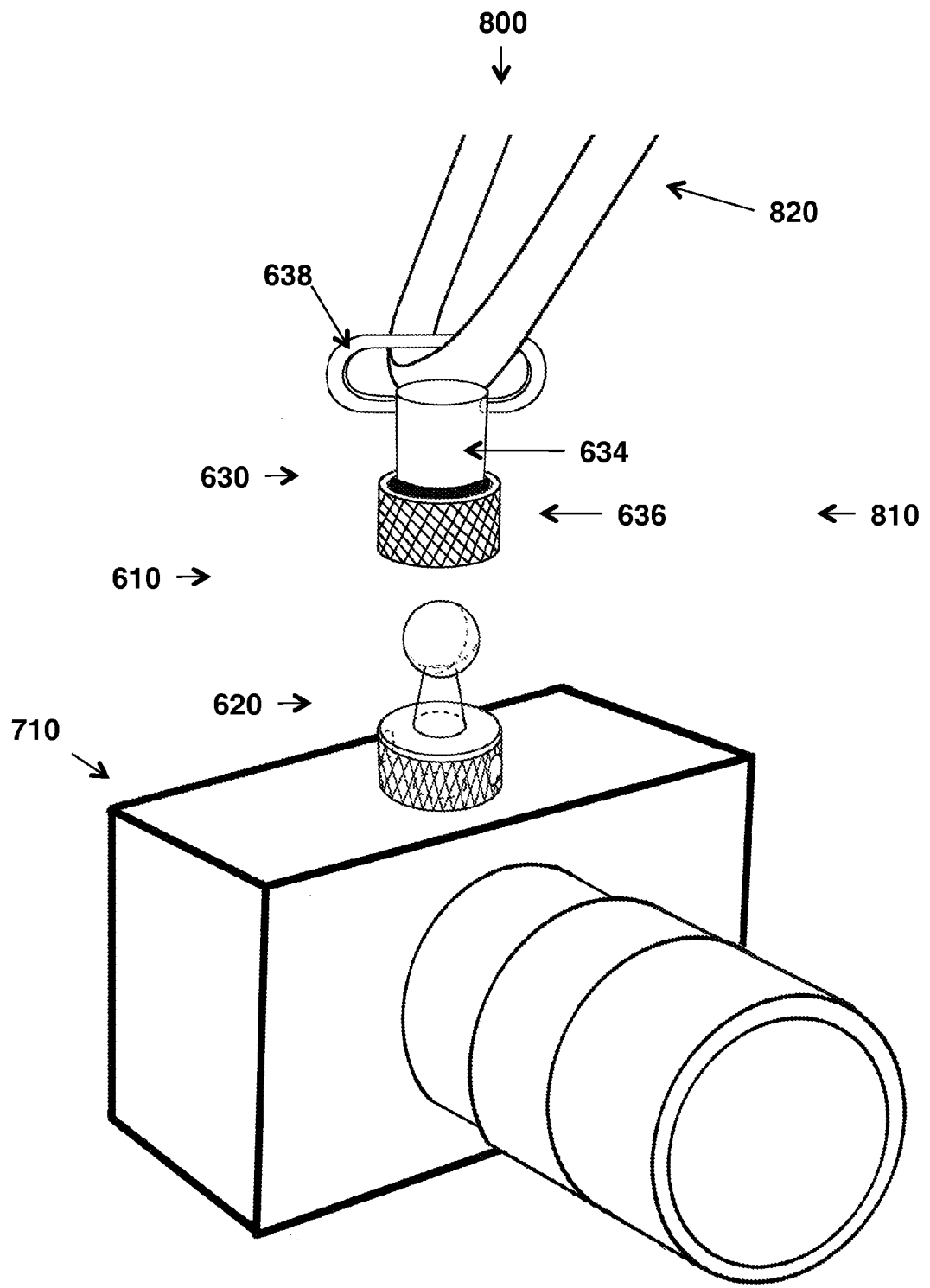
FIGS. 8A-8B depict the camera engagement system showing the strap receiving component with strap in alignment with the camera connecting component in engagement with the camera attachment point on the camera (FIG. 8A) and the strap receiving component with strap assembled with the camera connecting component (FIG. 8B).
Figure 8B:
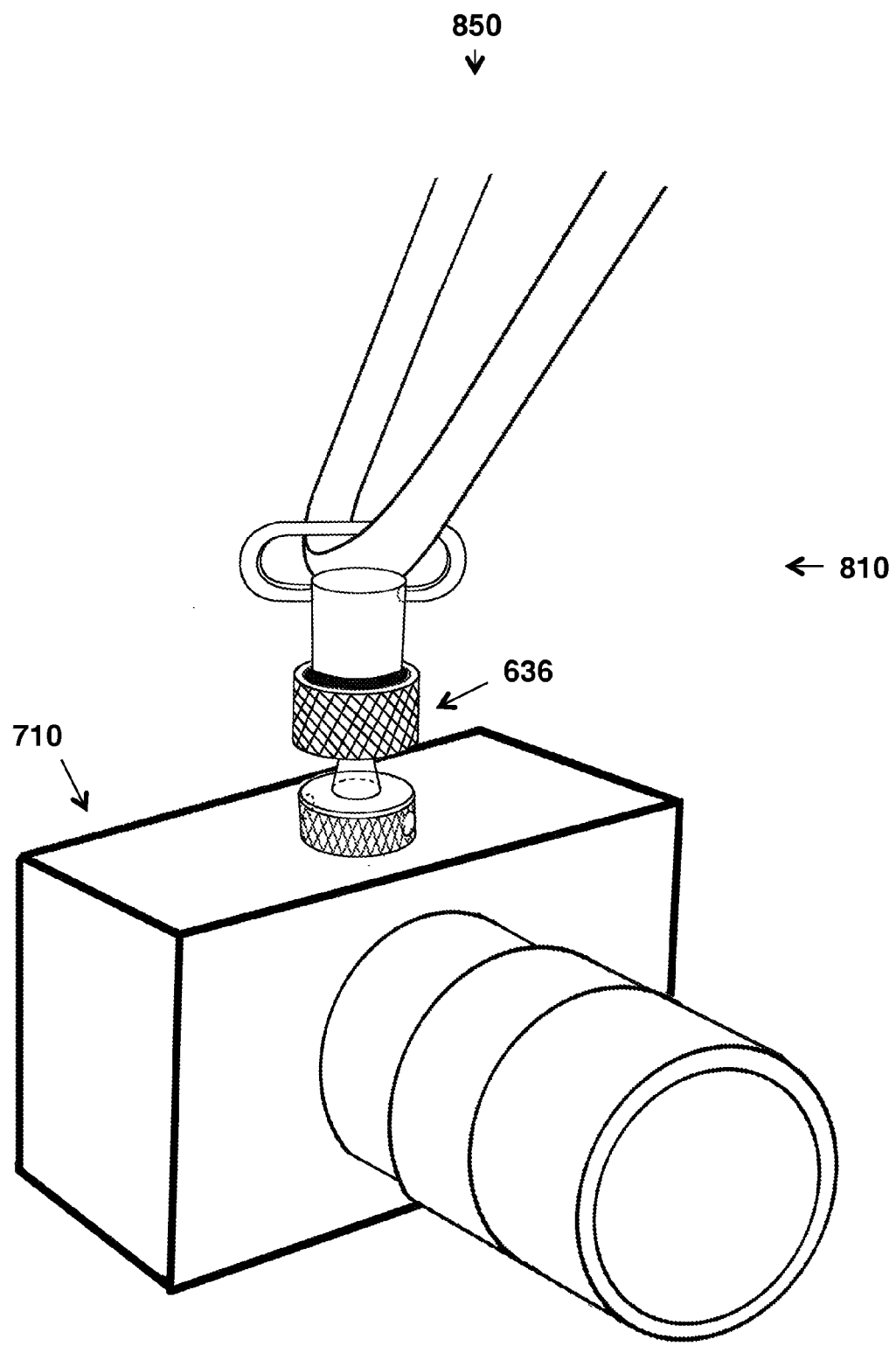

With continued reference to FIGS. 6A and 7, FIG. 8A is an exploded view 800a of the camera transport system 810. In addition to the camera engagement device 610, the view depicts a portion of a strap 820 slidably received through the strap receiving means 638 of the strap receiving component 630. In this configuration the sleeve 636 is depicted as threadably engaging the socket end 632 thereby better illustrating the strap receiving end 634. The strap receiving component is aligned to receive the ball end 626 of the camera connecting component or ball connector 620. The threaded end 622 of the camera connecting component is threadably engaged with the threaded camera attachment point 712, as shown in FIG. 7, on the bottom surface of the camera 710. With continued reference to FIGS. 6B and 7, FIG. 8B is a view 800b of the camera transport system 810 assembled on the camera 710. The view illustrates the positioning of the interiorally threaded sleeve 636 in threaded engagement with the exteriorally theaded socket 632 which contains the ball end 626 therein, as shown in FIG. 6B.

Figure 9A:
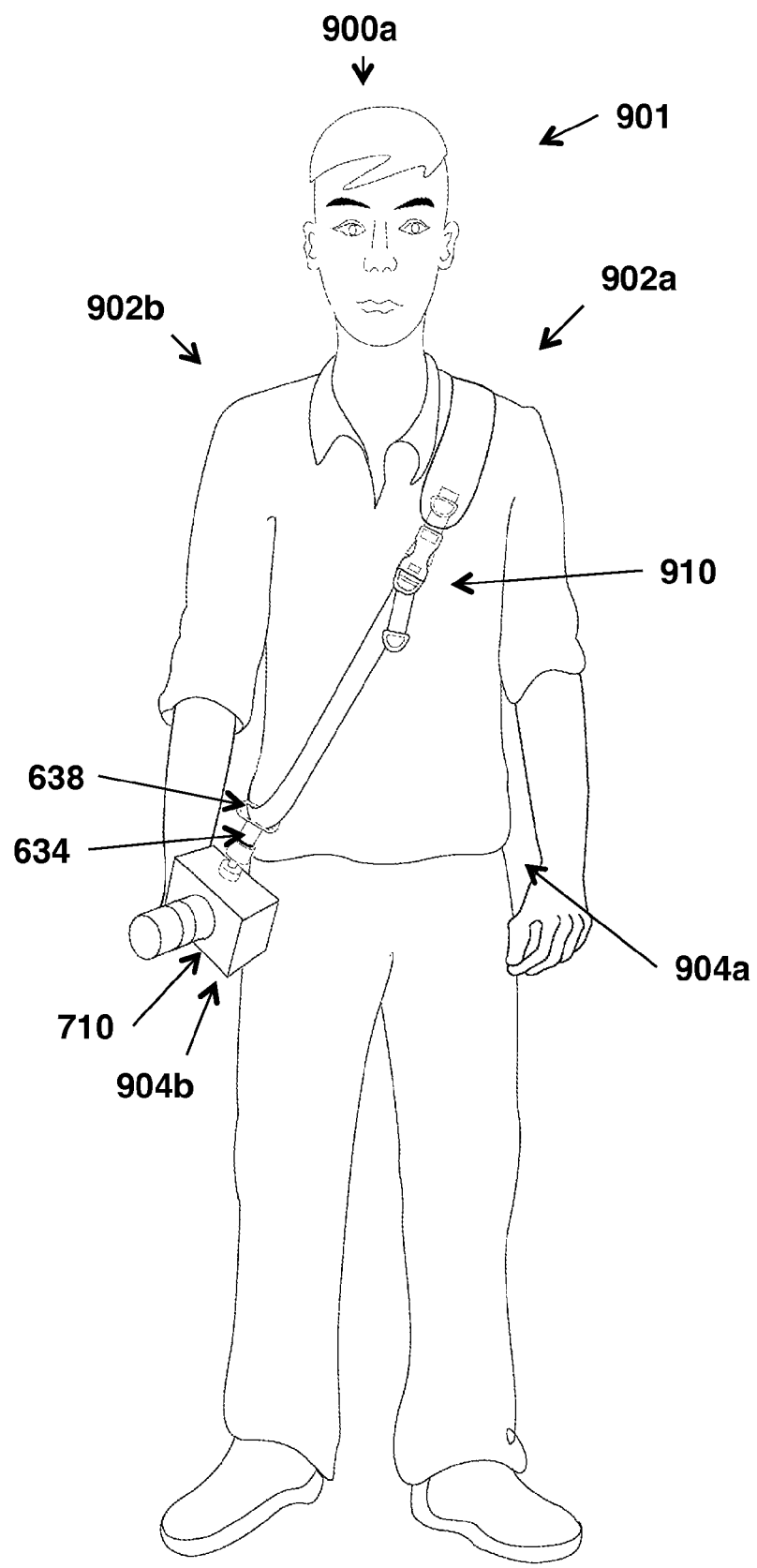
FIGS. 9A-9B depict the camera engagement system as worn by a user of the camera.
Figure 9B:
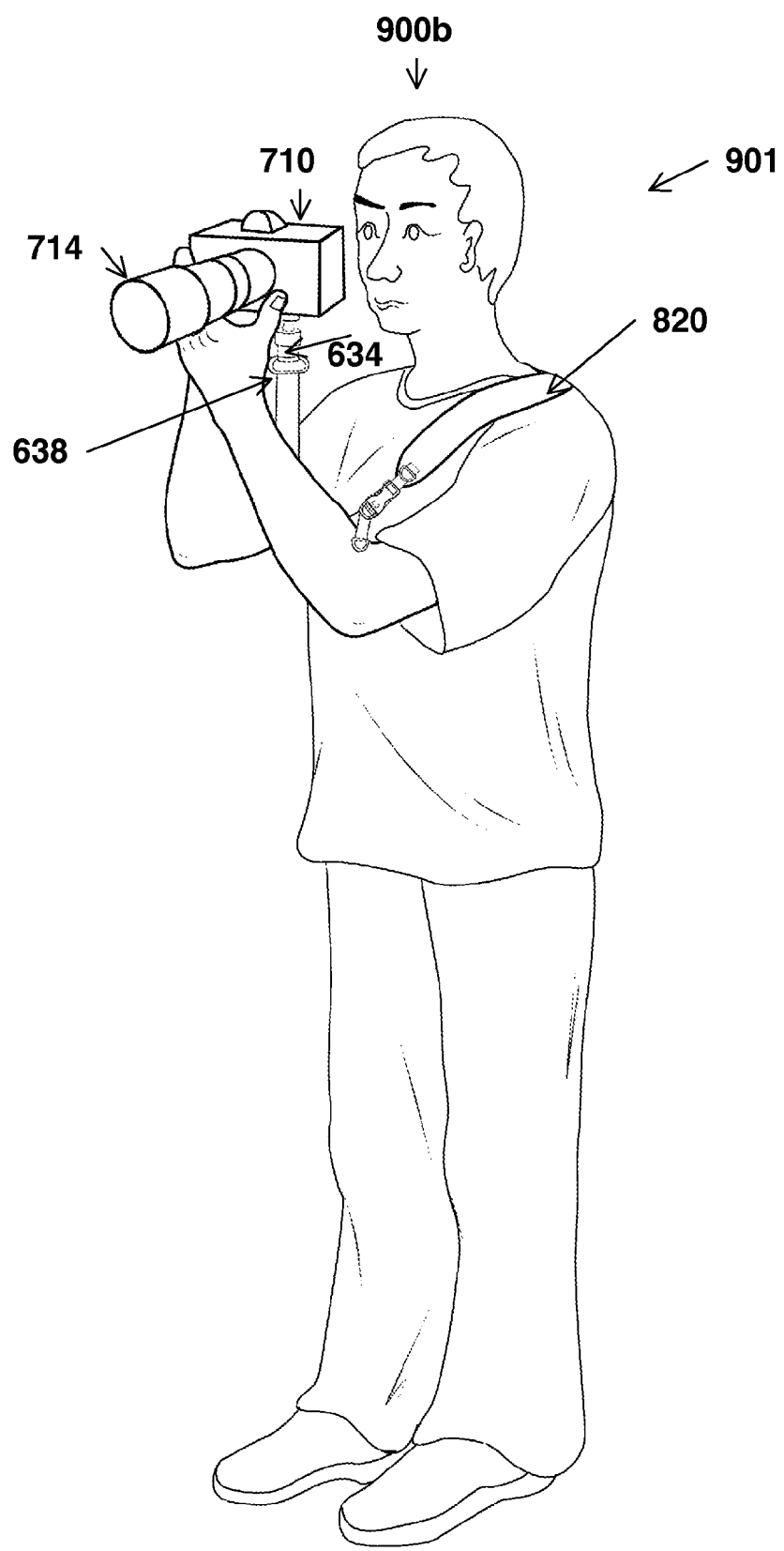

With continued reference to FIGS. 8A-8B, FIGS. 9A-9B depict the camera transport system 810 in front plan views 900a,b as worn and used by a user 901. The strap 820 may be worn over the shoulder 902 to cross the chest whereby the camera 710 engaged with the camera engagement device 610 rests in the area of the right hip 904b. The strap slidably passes through the strap receiving means 638 of the strap receiving end 634 and may be adjusted at 910, for example, lengthened or shortened, as suits each individual user, so that the camera rests comfortably and securely against the user. As depicted, the camera transport system is assembled for easier use by a right-handed person. However, because the camera can be rotated via the ball and socket configuration in the camera engagment device, the camera transport system readily accommodates a left-handed person where the strap is worn over right shoulder 902b and across the chest and the camera rests against the left hip 904a. View 900b in FIG. 9B illustrates that the right-handed user 901 can easily raise the camera 710 to eye level with the right hand while adjusting the camera lens 714 with the left hand or vice versa for a left-handed user. Raising the camera to the eye may comprise one or both of sliding the strap receiving means 638 of the strap connecting end 634 along the length of the strap 820 or raising the camera to the eye at the position where the strap passes through the strap receiving means.

Any patents or publications mentioned in this specification are indicative of the levels of those skilled in the art to which the invention pertains. Further, these patents and publications are incorporated by reference herein to the same extent as if each individual publication was specifically and individually incorporated by reference. One skilled in the art will readily appreciate that the present invention is well adapted to carry out the objects and obtain the ends and advantages mentioned, as well as those inherent therein. It will be apparent to those skilled in the art that various modifications and variations can be made in practicing the present invention without departing from the spirit or scope of the invention. Changes therein and other uses will occur to those skilled in the art which are encompassed within the spirit of the invention as defined by the scope of the claims.

What is claimed is:

1. A device for camera transport, comprising:
    a strap receiving component with a strap receiving means having a first end configured to slidably receive a strap therethrough and a socket threaded on an outer surface comprising a second end;
    a camera connecting component having an end configured to engage a threaded camera attachment point and a ball end received within the socket end; and
    a sleeve threaded on an inner surface and movable between the first and second ends of the strap receiving component and threadably engaging the threaded socket in a covering relationship.

2. The device of claim 1, further comprising a strap slidably passed through a strap receiving means on the strap receiving component.

3. The system of claim 2, wherein the strap is an adjustable strap comprising means for adjusting the length thereof.

4. A device for engaging a camera for transport thereof, comprising:
    a ball connector having a threaded end and a ball end configured to engage a camera attachment point on the camera and a second ball end; and
    a strap receiving component comprising a strap receiving means at a first end, a socket threaded on an outer surface at a second end and a sleeve threaded on an inner surface movably disposed between the first and second ends, said threaded sleeve configured to threadably engage the threaded socket in a covering relationship upon receiving the ball end of the ball connector within the threaded socket.

5. The device of claim 4, wherein the threaded end of the ball connector is configured to threadably engage the camera attachment point and the ball end is configured for receiving by the second end of the strap receiving component.

6. The device of claim 4, further comprising a strap slidably passed through the strap receiving means on the strap receiving component.

7. The system of claim 6, wherein the strap is an adjustable strap comprising means for adjusting the length thereof.

8. A system for engaging and transporting a camera, comprising:
    a camera connecting device having a first component configured to threadably engage the camera at a threaded camera attachment point and a second component, connected to said first component, configured to slidably receive a strap therethrough, said second component comprising a strap receiving means, a socket threaded on an outer surface and a sleeve having threads on an inner surface thereof movably disposed between the strap receiving means and the threaded socket, said sleeve configured to threadably engage the threaded socket in a covering relationship upon its connection to the first component, wherein said connection between the first and second components comprises a ball end of a ball connector within the threaded socket;
    the strap slidably received by the second component of the camera connecting device; and
    the camera threadably engaged with the first component of the camera connecting device.

9. The system of claim 8, wherein the first component comprises a threaded end and the ball end.

10. The system of claim 9, wherein the first component is the ball connector.

11. The system of claim 8, wherein the strap is an adjustable strap comprising means for adjusting the length thereof.

* * * * *